United States Patent Office 3,466,520
Patented Sept. 9, 1969

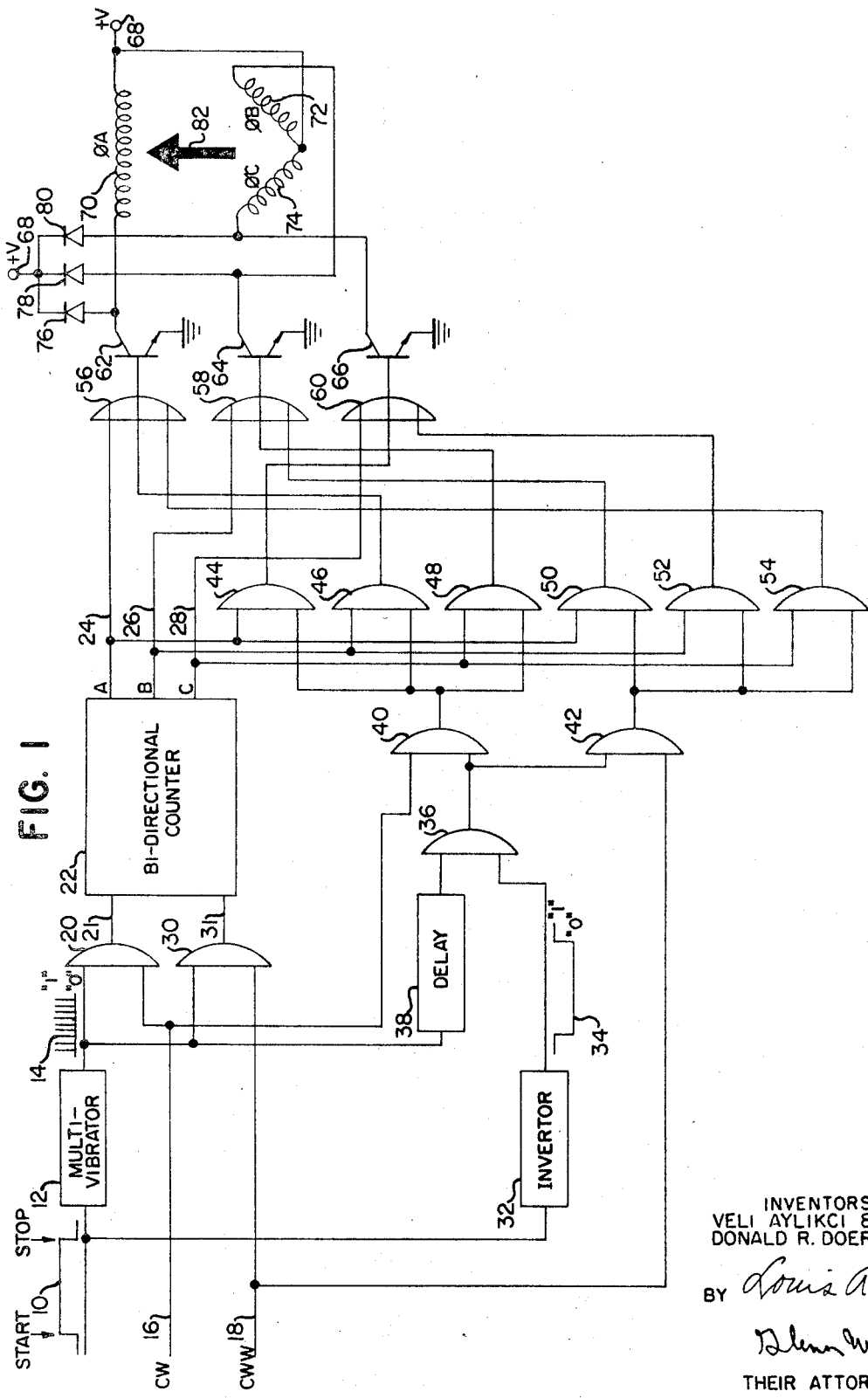

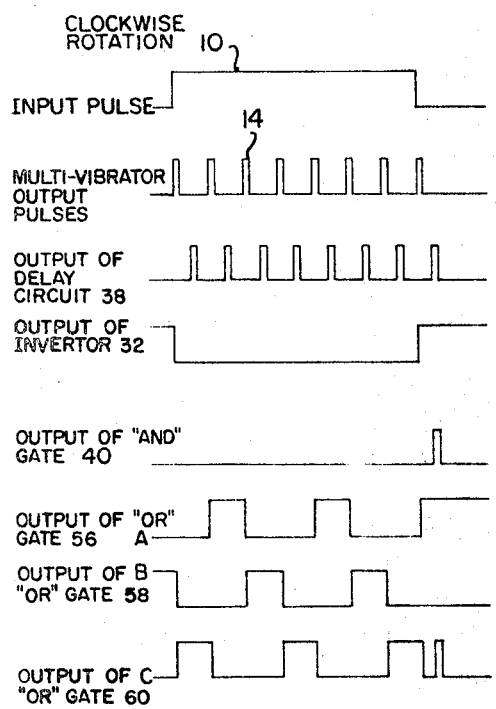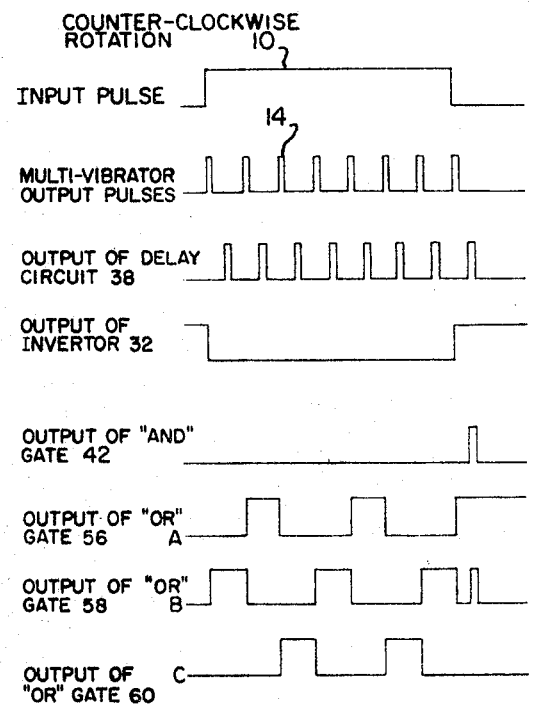

3,466,520
STEPPING MOTOR CONTROL INCLUDING DAMPING
Veli Aylikci, Bellbrook, and Donald R. Doering, Dayton, Ohio, assignors to The National Cash Register Company, Dayton, Ohio, a corporation of Maryland
Filed Jan. 25, 1967, Ser. No. 611,622
Int. Cl. H02p 1/22, 1/40
U.S. Cl. 318—138                                    8 Claims

ABSTRACT OF THE DISCLOSURE

A stepping motor control system designed to supply sequential drive pulses to a stepping motor to drive the rotor of the stepping motor either clockwise or counter-clockwise is provided with electrical circuitry that supplies a braking pulse to one phase of the motor following the application of a final drive pulse to another phase of the motor.

BACKGROUND OF THE INVENTION

The present invention relates to a motor control unit that provides starting and stopping control pulses to a stepping motor to stop the motion of the rotor of the stepping motor without overshoot or oscillation following the completion of a selected number of steps.

The braking of stepping motors has conventionally been accomplished by viscous damping, ratchet and pawl detent mechanisms, and electro-mechanical devices. These various braking methods are all accompanied by a number of disadvantages. Among these are high cost, long braking times, excessive complexity resulting in unreliable operation and short operating life, and excessive operating noise.

The present invention eliminates the above-mentioned disadvantages through a braking control system that provides a braking torque on the rotor of the stepping motor through energization of the same stator windings that are employed to provide driving torque on the rotor.

SUMMARY

The motor control unit of the present invention consists of logic circuitry which causes a stepping motor to step in either the clockwise or the counter-clockwise direction through a selected number of steps and then applies a braking pulse to the windings of one of the phases of the stepping motor to develop a torque on the rotor that opposes the torque developed on the rotor by the final drive pulse, which is applied to the windings of another phase of the stepping motor.

BRIEF DESCRIPTION OF THE DRAWINGS

FIGURE 1 is a logic diagram of the motor control unit.
FIGURE 2 is a timing chart of the control and braking signals for clockwise rotation of the stepping motor.
FIGURE 3 is a timing chart of the control and braking signals for counter-clockwise rotation of the stepping motor.

DESCRIPTION OF THE PREFERRED EMBODIMENT

FIGURE 1 is a logic diagram that illustrates the preferred embodiment of the present invention. The input pulse 10 is received from a variable width pulse generator (not shown). The input pulse 10 is supplied to the multivibrator 12, which is a conventional free-running multivibrator. The multivibrator supplies one or more output pulses 14 for each input pulse 10. The number of pulses produced by the multivibrator 12 depends on the width of the input pulse 10.

A selector switch (not shown) may be used to supply either a logic level clockwise singal, CW, or a logic level counter-clockwise signal, CCW, as desired, on the lines 16 or 18, respectively. The "AND" and "OR" gates employed in the embodiment of FIGURE 1 produces a "1" output signal when they are enabled by a "1" input signal. The CW, CCW, and input signals are considered to be present when they are in a "1" state.

When the "AND" gate 20 is enabled by the output pulses 14 and the CW signal on the line 16, it supplies the output pulses 14 to a bidirectional ring-counter 22 on the line 21, and the ring-counter 22 counts in the sequence A, B, C, so that the lines 24, 26, and 28 are successively actuated in that order. The counting sequence A, B, C, corresponds to a clockwise rotation of the rotor, as shown in FIGURE 2.

On the other hand, when the CCW signal is received on the line 18, the "AND" gate 30 is enabled, and this gate supplies the output pulses 14 to the ring-counter 22 on the line 31. Enabling of the "AND" gate 30 results in the ring-counter 22 conuting in the sequence A, C, B, so that the lines 24, 28, and 26 are successively actuated in that order. The counting sequence A, C, B, corresponds to a counter-clockwise rotation of the rotor, as shown in FIGURE 3.

The input pulse 10 is inverted by the inverter 32, and the inverted pulse 34 is applied to the "AND" gate 36. The output pulses 14 from the multivibrator 12 are delayed by the delay circuit 38 and are also supplied to the "AND" gate 36. During the period of time that the inverted input signal is at a "0" logic level, the "AND" gate 36 cannot be enabled. The "AND" gate 36 can be enabled only by the last output pulse of the delayed output pulse train from the delay circuit 38, since only at this time are both the output of the inverter 32 and the output of the delay circuit 38 at a "1" logic level. The output pulse produced by the last delayed multivibrator pulse causes the "AND" gate 40 to provide a "1" signal if the line 16 is supplied with a "1" logic level CW signal. If the line 18 is supplied with a "1" logic level CCW signal, the last delayed multivibrator pulse causes the "AND" gate 42 to provide a "1" signal. Timing for the above-described conditions is shown in FIGURES 2 and 3.

The A, B, and C count stages of the ring-counter 22 are individually coupled to the three input "OR" gates 56, 58, and 60, by the lines 24, 26, and 28, respectively. The outputs of the "OR" gates 56, 58, and 60 are in a "1" state whenever the counting stage coupled to the associated line 24, 26, or 28 is in a "1" state. The outputs of the "OR" gates 56, 58, and 60 are coupled to the NPN grounding transistors 62, 64, and 66, respectively. It is apparent that PNP transistors or other grounding devices may be substituted for the transistors 62, 64, and 66. A "1" state in the preferred embodiment is at a positive voltage level, and a "0" state is at a ground voltage level. The transistors 62, 64, and 66 are sequentially switched off and on individually, as shown in FIGURES 2 and 3. The positive voltage supply 68 is coupled to the windings 70, 72, and 74 of the stepping motor, which are spaced 120 electrical degrees apart around the circumference of the stator of the motor in the described embodiment. The present invention, however, is not limited to use with stator motors having only three windings, one for each phase, as shown in FIGURE 1. It is obvious that the invention may be directly employed to control stepping motors having more than one winding per phase. It is also apparent that the number of phases employed is not a limitation of the present invention. In addition, even- or odd-numbered phases may be employed within the scope of the present invention. The stepping motor that is controlled by the control unit of the preferred embodiment may be any unidirectional or bidirectional stepping motor having either an active or a reactive motor.

The positive voltage supply is also coupled to the cathodes of the diodes 76, 78, and 80. The anodes of the diodes 76, 78, and 80 are coupled to the collectors of the transistors 62, 64, and 66, respectively. When the transistors 62, 64, or 66 are in the "off" state, the cathode and the anode of the associated diode 76, 78, and 80, respectively, are both at the potential level of the supply voltage 68.

Application of a "1" logic level signal to the base of one of the transistors 62, 64, or 66 causes the transistor to saturate, thereby placing the anode of its associated diode, 76, 78, or 80, at a ground potential. Current then flows from the power supply 68, through the selected winding, and through the selected transistor to ground. For example, if the ring-counter 22 is in the A count state, the "OR" gate 56 will supply a "1" logic signal to the base of the transistor 62 that causes the transistor 62 to saturate, thereby supplying current to the winding 70. The transistors 64 and 66 are in their cutoff states at this time. The rotor of the motor, represented by the arrow 82 in FIGURE 1, is positioned in the direction illustrated in FIGURE 1 when the phase A coil 70 is conducting current and the phase B coil 72 and the phase C coil 74 are not conducting currents. When the count in the ring-counter 22 advances to the B state, the "1" signal on the line 24 is terminated, and a "1" signal appears on the line 26. The "OR" gate 58 then applies a "1," or positive, voltage signal to the base of the transistor 64. The transistors 62 and 66 are now both cut off, and the transistor 64 is saturated. The rotor now aligns itself with the phase coil 72. The direction of rotation in this instance is, therefore, clockwise. The rotor will continue to step in a clockwise direction, once for every output pulse 14 that is passed through the "AND" gate 21 to the ring-counter 22 as the count proceeds in the sequence ABCAB _ _ _.

If the CCW is present on line 18, instead of the CW signal on line 16, the described sequence is reversed, and the transistors 62, 66, and 64 are successively saturated and then cut off to drive the rotor 82 of the motor counter-clockwise. The count in the ring-counter 22 then proceeds ACBAC _ _ _.

The A, B, and C outputs from the ring-counter 22, found on the lines 24, 26, and 28, respectively, are also coupled selectively to the "AND" gates 44 through 54. The other input to each of the "AND" gates 44, 46, and 48 is coupled to the "AND" gate 40. Thus, the "AND" gates 44, 46, and 48 can produce a "1" output only during the time that the last delayed multivibrator pulse is coincident with an A, B, or C count state of the ring-counter and a "1" level CW signal is present on line 16, since the output of the "AND" gate 40 is a "1" only during this time.

The second input of each of the "AND" gate 50, 52, and 54 is coupled to the "AND" gate 42. Thus, the "AND" gates 50, 52, and 54 produce a "1" output only during the time the last delayed multivibrator pulse is coincident with an A, B, or C count state of the ring-counter, and a "1" level CCW signal is present on line 18, since the output of the "AND" gate 42 is a "1" only during this time.

When the last pulse of the output pulses 14 is counted by the ring-counter 22, the ring-counter 22 remains in the last count state, as shown in FIGURES 2 and 3. The "AND" gates 44 through 54 produce output signals corresponding in width to the final delayed multivibrator pulse whenever the corresponding "AND" gate is energized by the final state of the ring-counter 22. For example, assume that the ring-counter 22 ends in the A count state, as shown in FIGURE 2, after receipt of the last multivibrator pulse 14. This means that the rotor is rotating clockwise from position C to position A. The "AND" gate 44 will be temporarily brought to a "1" logic signal level when the delayed multivibrator pulse from the delay circuit 38 and the inverted input signal from the inverter 32 arrive simultaneously at the "AND" gate 36, thereby enabling the "AND" gate 40, when a CW signal is present on line 16. Activation of the "AND" gate 40 produces a delayed "1" logic level output pulse, of a duration shorter than the duration of a normal counting pulse, to appear at the input of the "AND" gate 44. The final count state of the ring-counter 22 causes the line 24 to be held in a "1" state, and consequently the "OR" gate 56 outputs a steady "1" logic level signal, causing the transistor 62 to saturate, thereby tending to lock the rotor at position A. The delayed "1" level pulse from the "AND" gate 40, however, initiates a "1" output from the "OR" gate 60 a predetermined time after the transistor 62 is saturated. Thus, with the rotor rotating clockwise, the transistor 66 is temporarily saturated, thereby supplying a delayed torque, which tends to drive the rotor counter-clockwise towards the phase C winding 74. This counter-clockwise torque effectively brakes the rotor at position A without overshoot or oscillation.

FIGURE 3 shows the situation where the rotor is rotating counter-clockwise from position B to position A, the final counting state of the ring-counter 22 being an A count, and the delayed braking pulse is applied by the transistor 64 that is associated with the B count line 26.

Application of the braking torque signals of the present invention to a rotating rotor allows the rotor to settle at the desired position almost instantaneously without oscillation or overshoot. The present invention, therefore, is especially advantageous in achieving fast and accurate positioning of stepping motors. A counteracting delayed braking pulse is supplied to the appropriate transistor 62, 64, or 66 regardless of the direction of rotation of the rotor and regardless of the final count state of the ring-counter 22 by the control system of the present invention.

What is claimed is:

1. A control system for a stepping motor having a plurality of phase windings, comprising:
    (a) means to produce one or more consecutive stepping signals, and
    (b) a counter having a plurality of counting stages equal in number to the number of phase windings of the stepping motor, said counter being coupled to the means to produce the stepping signals and being constructed to advance its count upon the receipt of each stepping signal, the output of each counting stage being coupled to a separate winding phase of the stepping motor to supply electrical drive current signals of a predetermined polarity to the winding phases to drive the rotor of the stepping motor sequentially through its positive steps in a forward direction, and
    (c) means to selectively supply an electrical braking current signal of the predetermined polarity to a selected first phase winding while the final electrical drive current signal is being supplied to a second phase winding, the first phase winding being selected so as to produce a torque that tends to rotate the rotor of the stepping motor in the reverse direction, thereby stopping the rotor of the stepping motor at its final position without overshoot or oscillation.

2. A device as in claim 1 wherein the braking signal is initiated after the final drive signal is initated.

3. A devce as in claim 2 wherein the first and second phase windings are adjacent phase windings.

4. A device as in claim 3 wherein said counter is a ring-counter.

5. A device as in claim 4 wherein the means to produce the consecutive stepping pulses is a means that responds to an input signal to produce one or more consecutive stepping signals, the number of consecutive signals produced being directly related to the width of the input signal.

6. A device as in claim 5 wherein
  (a) the means to selectively supply the electrical braking current signal includes digital logic initiation means, and
  (b) the last stepping signal that is produced is delayed and is supplied to the digital logic initiation means to initiate the electrical braking current signal after the final drive current signal has been initiated.

7. A device as in claim 6 wherein the means to produce the consecutive stepping pulses is a multivibrator.

8. A device as in claim 7 wherein
  (a) the ring-counter is a reversible ring-counter, and
  (b) counter-clockwise and clockwise digital selection logic means are employed to selectively control the counting direction of the ring-counter.

References Cited

UNITED STATES PATENTS

| | | | |
|---|---|---|---|
| 3,328,658 | 6/1967 | Thompson | 318—138 |
| 3,345,547 | 10/1967 | Dunne | 318—254 XR |
| 3,374,410 | 3/1968 | Cronquist et al. | 318—254 XR |
| 3,386,018 | 5/1968 | Smith-Saniz | 318—138 |

ORIS L. RADER, Primary Examiner

G. R. SIMMONS, Assistant Examiner

U.S. Cl. X.R.

318—254